United States Patent Office 2,911,241
Patented Nov. 3, 1959

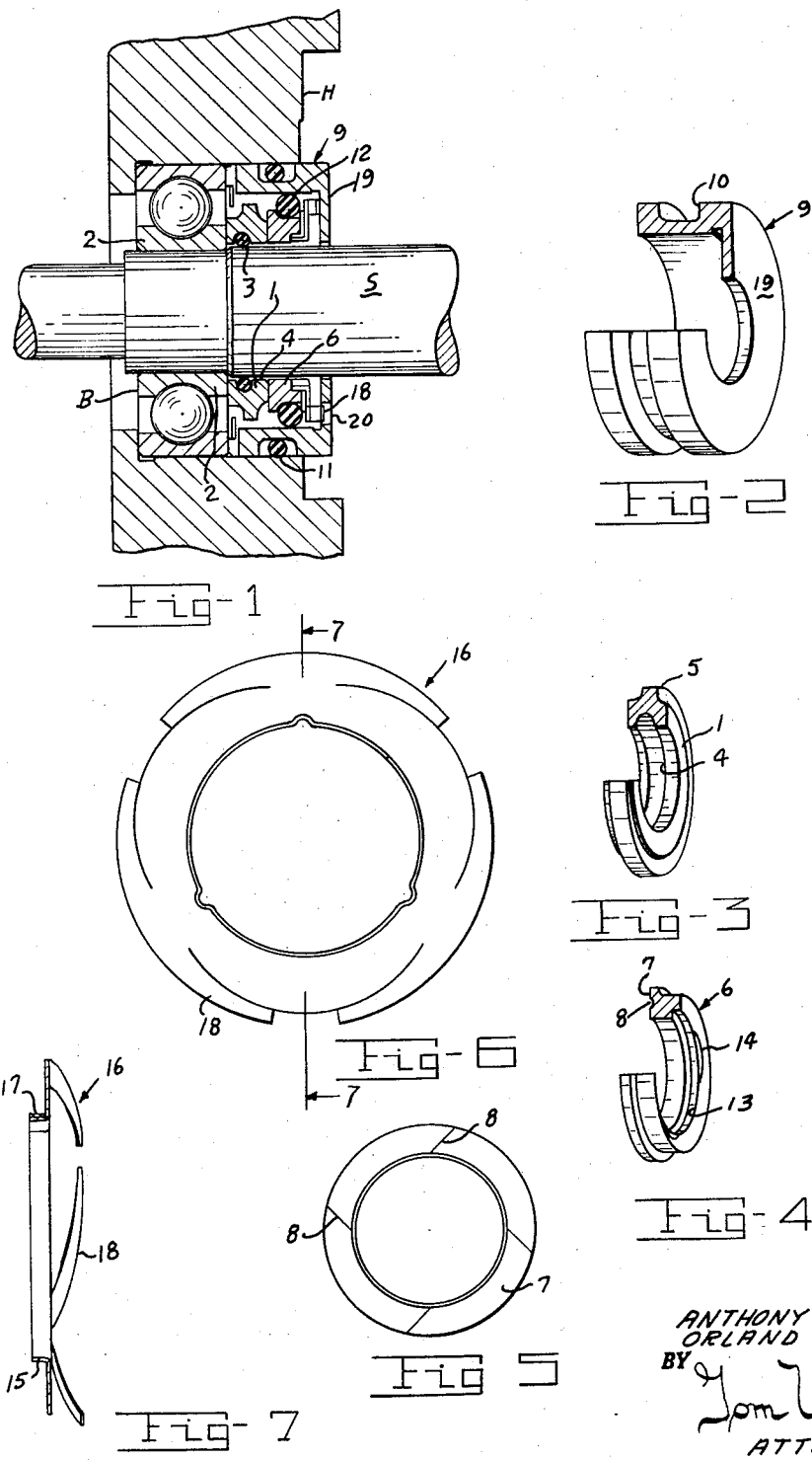

2,911,241

OIL SEAL ASSEMBLY

Anthony G. Horvath and Orland L. Schram, Dayton, Ohio, assignors, by mesne assignments, to The Reliance Electric and Engineering Company, Cleveland, Ohio, a corporation of Ohio Application December 13, 1955, Serial No. 552,771

9 Claims. (Cl. 286—11.14)

This invention relates to an improved oil seal assembly, and more particularly to what is known as a "double shoe" type of seal.

The problems in the oil seal art have always been many and vexing. They are now of particular concern to manufacturers of all types of machinery and equipment, since the greater production demands of today's complex business enterprises necessitates that seal efficiency reach a higher degree than ever. This is found necessary to prevent production machinery breakdown or product spoilage due to oil leakage from machinery utilized in product processing. Prior art seals, though many, have never been fully satisfactory and development and research thereon continues. Their efficiency has been generally relatively poor and their usefulness at their maximum efficiency has been of relatively short duration. This has created many maintenance and processing problems in industry.

The present seal was developed to meet the heavy loads and varied requirements of modern machinery and equipment. It is effective, even over long periods of use. It incorporates a novel ring element that provides a pumping action in use that insures against leakage through the oil seal. It also provides novel spring lock-in means which insures proper operation and proper disposition of the components of the improved oil seal assembly.

The object of the invention is to simplify the construction as well as the means and mode of operation of oil seals, whereby such seals may not only be economically manufactured, but will be more efficient and satisfactory in use, adaptable to a wide variety of applications, and be unlikely to get out of repair.

A further object of the invention is to provide an improved oil seal assembly incorporating a novel pumping ring element which insures against leakage through the oil seal.

Another object of the invention is to provide an improved oil seal assembly incorporating a novel lock retention spring element for locking the components of the seal assembly in a predetermined relation so that maximum seal efficiency is obtained.

An additional object of the invention is to provide a new and improved ring type seal element having grooves angularly disposed in the operating face thereof, whereby on use thereof in abutting relation to a seal shoe or the like, the oil entering therebetween will be pumped outward therefrom.

A further object of the invention is to provide an oil seal possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing, wherein is shown one but obviously not necessarily the only form of embodiment of the invention, Fig. 1 is a cross-sectional view of the improved oil seal assembly as employed in a bearing housing;

Fig. 2 is a partially sectioned detail perspective view of the oil seal housing element;

Fig. 3 is a partially sectioned detail perspective view of the oil seal shoe member;

Fig. 4 is a partially sectioned detail perspective view of the novelly improved stationary ring member of the seal assembly;

Fig. 5 is a view of the pumping face of the novel ring member shown in Fig. 4;

Fig. 6 is a front view of the lock retention spring of the oil seal assembly; and Fig. 7 is a cross-sectional view of the spring member shown in Fig. 6 taken on line 7—7 thereof.

Like parts are indicated by similar characters of reference throughout the several views.

The improved oil seal assembly can best be described with reference to the drawings. As shown in Fig. 1, the oil seal assembly may be employed in conjunction with a bearing B mounted on a rotatable motor shaft S and within a bearing housing H.

The oil seal assembly comprises an annular steel shoe member 1 arranged on shaft S in fixed abutting relation to the inner rotating race 2 of bearing B. An O ring 3 is provided within an inner circular concentrically arranged recess 4 in the shoe 1 so as to extend radially inwardly from the shoe and frictionally engage the shaft S. Rotation of the shoe 1 with the inner race of the bearing B and the shaft S is thereby insured. The shoe 1 also has a peripheral projection 5 thereon which serves as a slinger ring.

A stationary carbon ring element 6 is arranged concentrically about shaft S in spaced relation thereto and in adjacent contacting relation to shoe 1. The shoe contacting face 7 of the stationary ring 6 has a plurality of shallow grooves 8 therein which are spaced equidistantly thereabout as shown in Fig. 5. Each groove is angled in the normal direction of rotation of the shaft S with which it is to be employed. This angle may vary between 40 and 50 degrees from a radial direction providing a groove having either a constant or variable deviation from the radial direction. As shown in the preferred embodiment, the grooves 8 have a constant deviation of 45 degrees to the radial.

A cup-like oil seal housing 9 is provided about the shoe 1 and the ring 6 with the shaft S extending through an aperture in the housing 9 located centrally thereof. The external diameter of the housing 9 conforms to the internal diameter of the bearing recess in the housing H to securely seat therein with its open end adjacent the bearing B. The housing 9 is peripherally recessed at 10 to receive an O ring 11 seated therein which engages the internal surface of the bearing housing H. This insures a fixed relation and a seal therebetween.

The stationary ring 6 has its external diameter gradually reduced to a predetermined diameter at the side thereof opposite its shoe contacting face. An O ring 12 seats to the periphery of the carbon ring 6 at the reduced portion thereof, engaging the inner surface of the housing element 9 to frictionally lock and seal the ring 6 to the seal housing 9. This tends to maintain the ring 6 stationary during rotation of the shaft S. The outer face of the stationary ring 6 opposite its shoe contacting face is provided with a step 13 therein, to increase the internal diameter of ring 6 at this point. This step 13 in the outer face of the ring 6 is provided with three equidistantly and circumferentially spaced notches 14 therein.

Concentrically seated within the stepped portion of the stationary ring 6 is an axially extending circular flange 15 of a generally circular spring member 16. The flange 15 has three projections 17 extending radially outward therefrom and equidistantly spaced thereabout. The flange projections 17 engage in the notches 14 in the ring 6. The circular spring member 16 extends radially outwardly from the flange 15 at the outer extremity thereof. The spring 16 is fabricated with three arcuate cuts therein equidistantly spaced thereabout intermediate the inner and outer boundaries thereof. Small sections in the outer periphery of the spring in the area opposite the central portion of each arcuate cut are removed. This provides opposed spring fingers 18 extending towards each other in the area adjacent to each arcuate cut. As shown in Fig. 7 of the drawings, the fingers 18 are bent from the plane of the spring outwardly in the direction of, and to engage, the inner surface of the cup portion 19 of the cup-shaped oil seal housing 9. An aperture 20 is provided in this cup portion 19 for engagement by one of the opposed fingers 18 in a manner to be described.

The operational use of the novelly improved oil seal assembly is as follows. The steel shoe 1 is retained in fixed abutting relation to the inner bearing race 2 by the biased stationary ring 6. And due to the O ring 3 providing positive association of the shoe to the shaft, as the shaft rotates, the shoe 1 will rotate therewith. The O ring 3, of course, provides a positive seal between the shoe and the shaft. As the shaft rotates, the shoe projection 5 serves as a slinger ring to throw the oil leaking past the bearing B outwardly within the housing therefor. The oil would normally have a tendency to leak through between the shoe 1 and the ring 6 in an ordinary seal. But with a seal made in accordance with this invention, in the event that oil seeps between the outer face of the shoe and the contacting face of the ring 6, the grooves 8 in the shoe contacting face of the ring 6 serve to wipe the oil from the outer face of the shoe and to project or pump such fluid radially outwardly into the seal housing. This prevents any inadvertent leakage past the seal through this path.

The flange 15 of the circular spring 16 seating in the step 13 in the stationary ring 6 has its projections 17 extending into the notches 14 in the ring 6. This insures that as the shaft S rotates, that if there is any impulse tending to rotate the stationary ring 6, the projections 17 would readily be engaged by the extremities of the notches 14 in the ring 6. Thus, the ring is limited by the spring assembly. And in turn, as the spring would receive the rotational impulse, one of its projecting spring fingers 18 which are biased against the inner surface of the cup portion of the seal housing engages in the aperture 20 in the oil seal housing which is in fixed relation to the bearing housing.

Accordingly, since opposed spring fingers are provided on spring 16, regardless of the direction of rotation of the shaft S, any rotational impulse applied to the ring 6 will be automatically blocked to fix the ring 6 and the lock retention spring 16 in fixed relation to the oil seal housing. In this fashion a positive and complete seal obtains under any condition of operation of the shaft. The control of the stationary ring 6 by the lock retention spring provides an effective means for restraining the ring 6 against rotation. Thus as the shoe 1 rotates with the shaft S the pumping action of the grooves 8 is continuously effective to prevent leakage of oil past the seal.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in langauge more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A seal unit for a rotating member and bearing therefor, comprising a first ring member for application to the rotating member in abutting relation to the bearing therefor, said first ring member having a seal element seated therein, effective to provide a seal with the rotating member on mounting thereto, a second ring member arranged in abutting relation to the outer face of said first ring member, a cup shaped housing element mounted about said ring members and having means externally thereof adapting it to be mounted in fixed sealed relation to the bearing support, the cup end of said housing element being centrally apertured to receive the rotating member therethrough, said second ring member having a sealing element secured thereto and to the inner wall of said housing element providing a seal therewith, a spring element intermediate said housing element and the outer face of said second ring member in respectively abutting relation thereto, said spring element, said housing element and said second ring member having means formed to interengage in response to receipt of a rotational impulse by said second ring member to prevent rotation thereof, and angled grooves provided in at least one of the mutually contacting surfaces of said ring members effective on relative rotation thereof to provide a pumping action rejecting any fluid attempting to pass therebetween.

2. A seal unit for a rotating member and bearing therefor, comprising a first ring member for application to the rotating member in abutting relation to the bearing therefor, said first ring member having a seal element seated therein, effective to provide a seal with the rotating member on mounting thereto, a second ring member having one face thereof in abutting relation to the outer face of said first ring member, a housing mounted about said ring members having fixed sealed relation to the bearing support, said second ring member having an external seal element secured thereto and to the inner wall of the seal housing providing a seal therewith, means providing a recess in the other face of said second ring member, limit means on the opposed inner wall of said seal housing, and a spring member interposed between said second ring member and the inner wall of the seal housing and having means engaging in the recessed portion of the second ring member and with said limit means respectively, operative on rotation of the rotatable member to prevent rotation of said second ring member, and means providing recesses in at least one of the mutually contacting faces of said ring members, said recesses being angularly disposed in identical fashion and deviating in the direction of rotation of the rotating member whereby any fluid attempting to pass between said mutually contacting faces will be radially rejected.

3. An oil seal assembly for a rotatable shaft and bearing therefor, comprising a cup shaped housing for mounting about the shaft to one side of the bearing, an annular pump element within the housing and adapted to be mounted about the shaft in spaced relation thereto, sealing means connected between said annular element and the inner surface of said housing resisting relative rotation therebetween, a spring element interposed between said housing and the outer face of said annular element, means interengaging the spring element with the annular element in said housing to lock said annular element against rotation on rotation of said shaft, an annular shoe member within said housing for mounting about the shaft having one face thereof in contacting relation to the inner face of said annular element, means sealingly connected with said shoe member providing a seal with the shaft on mounting thereto with the other face of the shoe in closely abutting relation to the bearing, the shoe thereby being fixed for rotation with the shaft, and shallow grooves provided in the shoe contacting face of said annular element operable on rotation of the shaft to effect a sealing pump action between the shoe and said annular element to reject entrance of oil therebetween.

4. A seal unit for a rotating member and bearing therefor, comprising a first ring member for application to the rotating member in abutting relation to the bearing therefor, said first ring member having a seal element seated therein, effective to provide a seal with the rotating member on mounting thereto, a second ring member arranged in abutting relation to the outer face of said first ring member, a cup shaped housing element mounted about said ring members and having means externally thereof adapting it to be mounted in fixed sealed relation to the bearing support, the cup end of said housing element being centrally apertured to receive the rotating member therethrough, said second ring member having a sealing element secured thereto and to the inner wall of said housing element providing a seal therewith, a spring element intermediate said housing element and the outer face of said second ring member in respectively abutting relation thereto for locking engagement therewith, angled groove means provided in at least one of the mutually contacting surfaces of said ring members effective on relative rotation thereof to provide a pumping action rejecting any fluid attempting to pass therebetween, said outer face of said second ring member being provided with arcuately arranged notched portions, projection means extending from said spring element to engage in said notched portions of said second ring member to limit relative rotational movement thereof, opposed spring fingers from said spring element in biased relation to the inner wall of said housing element and an aperture in the wall of the housing element in the path of said fingers whereby on a rotational impulse to said second ring member, irrespective of the direction, one of said spring fingers will engage in the aperture and lock the second ring member against movement relative to the housing element.

5. An oil seal assembly for a rotatable shaft and bearing therefor, a cup shaped seal housing, said seal housing being centrally apertured to receive the shaft therethrough and having sealing means externally thereof for fixed sealing engagement with the bearing support, a ring element within said seal housing adapted for receiving the shaft therethrough in spaced relation thereto, sealing means radially connecting said ring element and the inner surface of said seal housing, spring means seating between said ring element and the seal housing and having means cooperatively related therewith operable on rotation of the shaft to lock said ring against rotation with said shaft, an annular shoe member within said seal housing having one face thereof in closely abutting relation to said ring element, sealing means seated within said shoe member and adapted to sealingly engage the shaft on mounting thereto for rotation therewith and relative the fixed ring element, and spaced angled grooves provided in the shoe contacting face of said ring element operable on rotation of said shaft to effect a sealing pump action between the shoe and said ring member to radially reject any fluid seeping between the said shoe and said ring element.

6. An oil seal assembly for a rotatable shaft and bearing therefor, comprising a seal housing centrally apertured to receive the shaft therethrough, an O ring seated in said seal housing and extending externally thereof for fixed sealing engagement with the bearing support, a pump element mounted within said seal housing which is centrally apertured to receive the shaft therethrough in spaced relation thereto, an O ring seated in the outer surface of said pump element and sealingly engaged with the inner surface of said seal housing, a spring element seated between said pump element and said seal housing and having lock means cooperatively engaging said pump element and said seal housing and operable on rotation of the shaft to automatically lock said pump element to said seal housing to prevent rotation thereof by the shaft, an annular shoe having one face thereof in closely engaged relation with said pump element, a third O ring seated in said annular shoe and adapted to sealingly engage the shoe to the shaft on mounting thereto whereby said shoe will rotate with said shaft, said pump element including slight grooves in the shoe contacting face thereof which are angled in the direction of rotation of the shaft and operable on rotation of the shaft to effect a sealing pump action between the shoe and the pump element to radially reject any fluid attempting to escape therethrough past the seal.

7. An oil seal assembly for a bearing for a rotatable element, comprising a seal housing for mounting about the rotatable element, a sealing element mounted on the seal housing and adapted to engage the bearing support to establish a fixed position to said seal housing, a ring element within said seal housing centrally apertured to receive said rotatable element therethrough in spaced relation thereto, a seal element engaged in the periphery of said ring element and sealingly engaged to the inner surface of said seal housing providing a seal therebetween, a resilient lock element interposed between one face of the ring element and the inner surface of the seal housing having lock means cooperatively engaging said ring element and said seal housing operable on rotation of the rotatable element to prevent rotation of the ring element relative to the seal housing, a shoe member centrally apertured and disposed in abutting relation to the other face of said ring element, a sealing element seated in said shoe and extending radially inward thereof for sealing engagement with the rotatable element on mounting thereto and being thereby rotatable therewith, and means providing shallow grooves in said other face of said ring element, said grooves being angled in the direction of rotation of the rotatable element at an angle of substantially 45 degrees to the radial whereby on rotation of the rotatable element and the shoe, a pumping action is effected between the shoe and the ring to continuously peripherally reject fluid seeping therebetween.

8. A seal unit for application to a rotatable member to seal a bearing therefor, comprising a first ring element for application to the rotatable member in abutting relation to the bearing, said first ring element having an internal ring seal seated therein, effective to provide a seal with the rotating member on mounting thereto, a second ring element arranged in abutting relation to the outer face of said first ring element, a housing element mounted about said ring elements and adapted for fixed relation to the bearing, said second ring element having an external ring seal secured thereto and to the inner wall of said housing element providing a seal therewith, the outer face of said second ring element having a step therein at the inner diameter thereof, notches in the outer face of said second ring element opening into the recess provided by the said step, a generally circular spring element seated between said outer face of said second ring element and said housing element, opposed spring fingers extending from said spring element in biased relation to the housing element, means integral with said spring element seating in the stepped portion of said second ring member and having projections engaging in the notches, limit means on said housing element engaged by one of said opposed fingers on rotation of the rotatable member to lock said second ring element relative to the housing element, and means provided in at least one of the mutually contacting surfaces of said ring elements effective on relative rotation thereof to reject passage of fluid therebetween.

9. A seal unit for a rotating member and a bearing therefor mounted to a bearing support comprising, a first ring member for application to the rotating member in abutting relation to the bearing, said first ring member having sealing means seated therein providing a seal with the rotating member on mounting thereto, a second ring member arranged in abutting relation to the outer face of said first ring member, a housing element mounted about said ring members having means externally thereof adapting it to be mounted in fixed sealed relation to the bearing support, said housing element being centrally apertured to receive the rotatable element therethrough outwardly of said second ring member, said second ring member having a sealing element secured thereto and to the inner wall of the housing element providing a seal therewith, a lock plate intermediate said housing element and the outer face of said second ring member, means providing lock recesses in the outer face of said second ring member, said plate element having a central aperture defined by a circular flange projecting from its face adjacent said second ring member, said flange having lock projections engaging in the recesses in the outer face of said second ring member, means defining at least one lock aperture in said housing element adjacent said lock plate and circularly aligned oppositely extending fingers projecting from the other face of said lock plate for locking in said lock aperture in the housing element on rotation of said second ring member relative thereto, irrespective of the direction of rotation, whereby to prevent rotation of said second ring member with said first ring member.

References Cited in the file of this patent

UNITED STATES PATENTS

| | | |
|---|---|---|
| 1,505,075 | Rhinevault | Aug. 12, 1924 |
| 1,722,478 | Nelson | July 30, 1929 |
| 1,801,655 | Brown | Apr. 21, 1931 |
| 2,325,193 | Nutt et al. | July 27, 1943 |
| 2,429,562 | Oakes | Oct. 21, 1947 |
| 2,575,549 | Doble | Nov. 20, 1951 |
| 2,675,225 | Migny | Apr. 13, 1954 |
| 2,706,652 | Berger | Apr. 19, 1955 |

FOREIGN PATENTS

| | | |
|---|---|---|
| 627,082 | France | May 30, 1927 |